(12) United States Patent
Tan et al.

(10) Patent No.: US 7,435,141 B2
(45) Date of Patent: Oct. 14, 2008

(54) CONNECTOR APPARATUS, AND ASSOCIATED METHOD, FOR POWERING A SET OF CONSUMER ELECTRONIC DEVICES

(75) Inventors: Lian Sze Philip Tan, North Point (HK); Man Lung Lam, Tai Po (HK); Man Tai Vincent Lam, Sheung Shui (HK)

(73) Assignee: Radioshack Corporation, Forth Worth, TX (US)

( * ) Notice: Subject to any disclaimer, the term of this patent is extended or adjusted under 35 U.S.C. 154(b) by 387 days.

(21) Appl. No.: 10/964,146

(22) Filed: Oct. 12, 2004

(65) Prior Publication Data

US 2006/0087246 A1 Apr. 27, 2006

(51) Int. Cl.
*H01R 25/00* (2006.01)
(52) U.S. Cl. ..................................... 439/638
(58) Field of Classification Search ................. 439/502, 439/638; 320/111, 112, 113, 119
See application file for complete search history.

(56) References Cited

U.S. PATENT DOCUMENTS

| | | | | |
|---|---|---|---|---|
| 2,994,849 A * | 8/1961 | Mussari, Jr. | ................. | 439/105 |
| 4,829,224 A * | 5/1989 | Gandelman et al. | ......... | 320/116 |
| 5,350,949 A * | 9/1994 | Yazi | ............................ | 307/150 |
| 5,801,513 A * | 9/1998 | Smith et al. | .................. | 320/113 |
| 6,160,378 A * | 12/2000 | Helot et al. | .................. | 320/119 |
| 6,191,552 B1 * | 2/2001 | Kates et al. | ................. | 320/112 |
| 6,664,758 B2 * | 12/2003 | Yang | .......................... | 320/107 |
| 6,774,603 B2 * | 8/2004 | Liao | ............................ | 320/107 |
| 6,894,457 B2 * | 5/2005 | Germagian et al. | ......... | 320/119 |
| 2005/0040788 A1 * | 2/2005 | Tseng | ........................ | 320/111 |

OTHER PUBLICATIONS iGo(tm) Mobility Electronics Internet advertisement for iGo Juice(70) UniversalHome/Office & Auto/Air Notebook Power Adapter; date unknown, but at least as early as Jul. 27, 2004.
iGo(tm) Mobiltiy Electronics Internet advertisement for iGo DualPower Accessory for Portable Electronics; date unknown, but at least as early as Jul. 27, 2004.

* cited by examiner

*Primary Examiner*—Neil Abrams

(57) ABSTRACT

Connector apparatus, and an associated method, by which to apply electrical power to a set of consumer electronic devices, such as a laptop computer and a mobile phone, or other portable device. The connector includes an input port to which a source of input power is applied, such as the electrical power provided by way of a power cable of the laptop computer, once suitably connected to a source of permanent electric power. The connector apparatus includes a set of output ports, a first port of which is connectable to the laptop computer and a second port of which is connectable to the other portable electronic device. A user of the consumer electronic devices is able thereby to power both of the devices with connection of only a single power cable to a permanent power supply source.

15 Claims, 4 Drawing Sheets

84

```
        ┌─────────────────────────┐
        │   APPLY INPUT POWER     │──86
        │ TO INPUT POWER RECEIVER │
        │   SUPPORTED AT HOUSING  │
        └───────────┬─────────────┘
                    ▼
        ┌─────────────────────────┐
        │  SPLIT INPUT POWER INTO │──88
        │    FIRST AND SECOND     │
        │    POWER COMPONENTS     │
        └───────────┬─────────────┘
                    ▼
        ┌─────────────────────────┐
        │   PROVIDE FIRST POWER   │──92
        │      COMPONENT TO       │
        │       FIRST POWER       │
        │  PROVIDER CONNECTABLE   │
        │     TO FIRST DEVICE     │
        └───────────┬─────────────┘
                    ▼
        ┌─────────────────────────┐
        │     PROVIDE SECOND      │──94
        │   POWER COMPONENT TO    │
        │   SECOND POWER          │
        │  PROVIDER CONNECTABLE   │
        │    TO SECOND DEVICE     │
        └─────────────────────────┘
```

FIG. 4

CONNECTOR APPARATUS, AND ASSOCIATED METHOD, FOR POWERING A SET OF CONSUMER ELECTRONIC DEVICES

The present invention relates generally to a manner by which to provide electrical power to two, or more, consumer electronic devices. More particularly, the present invention relates to connector apparatus, and an associated method, by which to convert input power, provided by an input power source, into output power, available at a set of output power ports, that provides operative power for application to the consumer electronic devices.

A first of the consumer electronic devices forms, e.g., a laptop computer that has a power cable releasably connectable thereto. The power cable includes a converter, such as an AC-DC converter, that converts power, sourced at a household, or other permanent, power supply to DC power of characteristics usable by the consumer electronic device. The connector apparatus is connected in-line between the power cable and the laptop computer to power the laptop computer. The laptop computer is connected to a first of the output power ports. A second consumer electronic device is connected to a second output power port to receive operative power therefrom. A user of the consumer electronic devices is able thereby to power both of the consumer electronic devices by way of a single power cable, permitting concurrent operation of the consumer electronic devices more convenient. Power applied to the consumer electronic device is selectably used both to operate the consumer electronic devices and to recharge portable battery power supplies embodied at the devices.

BACKGROUND OF THE INVENTION

Advancements in electronic and processing technologies have permitted the development, manufacture, sale, and usage of a wide variety of consumer electronic devices. And as advancements continue to be made, their use in the development and commercialization of additional consumer electronic devices shall correspondingly continue.

Many consumer electronic devices are of dimensions and weights that permit their hand carriage by a user. Typically, a consumer electronic device includes electronic circuitry housed within a housing. The housing supportively houses the electronic circuitry. Some consumer electronic devices also include removable storage media that are removably engageable with the electronic circuitry. In such devices, the housing generally is of a construction that permits the removable storage media to be supportively engaged with the electronic circuitry of the consumer electronic device and also to be removed out of engagement therewith.

When of dimensions to permit and carriage by the user of the consumer electronic device, the device typically includes a portable power supply, such as a battery power supply or battery pack. The portable power supply provides operative power to power the electronic circuitry of the device and obviates the need, while a suitable level of stored energy remains stored at the portable power supply, to power the electronic device. The period of time during which the device can be powered by the portable power supply is dependent upon the power requirements of the device and of the amount of stored energy, stored at the portable power supply. Because the amount of energy that is storable at the portable power supply is finite, the period during which the electronic device can be powered by the portable power supply is correspondingly finite. When the portable power supply becomes depleted of stored energy necessary to power the electronic device, the portable power supply must be replaced with a replacement power supply or the electronic device must be coupled to a permanent supply of electrical power, such as by connection to the permanent power supply by way of a power cable.

The portable power supply is formed, sometimes, of rechargeable batteries or battery packs. A rechargeable battery power supply also provides operative power to power a device to which it is connected. When depleted of stored energy, the power supply is recharged, that is, provided with additional energy to be stored thereat to permit subsequent powering of the electronic device with the battery power supply, once recharged.

Recharging of the portable power supply is carried out, for instance, by providing the rechargeable, portable power supply with energy sourced at a permanent power supply such as a household electrical power supply. When the energy used to recharge the battery power supply is sourced at a household power supply, the characteristics of the power are converted into a form to permit the recharging of the battery power supply. A power cable, and appropriate converter, interconnects the household power supply and the consumer electronic device at which the rechargeable portable power supply is positioned.

A fairly common practice of many users of consumer electronic devices is to power the device with the portable power supply when needed and to power the device with a permanent power supply, when available. When the device is powered by the permanent power supply, if the battery power supply is a rechargeable battery power supply, the battery power supply is recharged while the device is being powered by the permanent power supply.

A user might sometimes operate concurrently two or more consumer electronic devices, each powered by a separate portable power supply or powered by a permanent power supply, at least to recharge the battery power supplies of the respective devices. Separate power cables for the separate devices are conventionally utilized to interconnect the devices and the household power supplies, or other permanent source of power. The multiplicity of power cables is cumbersome and inconvenient to a user of the devices.

For instance, a user might carry both a laptop computer and a mobile phone, personal digital assistant (PDA), or other device. A laptop computer is conventionally powered by a rechargeable power supply and, alternately, by a permanent power supply to which the laptop computer is connectable by way of a power cable. The power cable typically includes a power converter for converting the characteristics of the permanent power supply into characteristics useable by the laptop computer. Power of similar characteristics is typically also sometimes used by other consumer electronic devices, such as the PDA or mobile phone, at least for purposes of recharging the rechargeable battery power supplies of such other devices.

If a manner could be provided by which to power both of the devices by way of a common power cable, increased convenience would be provided to the user of the devices.

It is in light of this background information related to the powering of consumer electronic devices that the significant improvements of the present invention have evolved.

SUMMARY OF THE INVENTION

The present invention, accordingly, advantageously provides apparatus, and an associated method, by which to provide electrical power to two, or more, consumer electronic devices.

Through operation of an embodiment of the present invention, a manner is provided by which to convert input power, provided by an input power source, into output power, available at a set of output power ports. The power available at the output power ports provides operative power for application to the consumer electronic devices.

In one aspect of the present invention, a connector is provided that provides an input power port of a configuration permitting input power, sourced at a permanent power supply, to be received thereat. The input power port, for instance, forms a plug-socket connector piece that permits plugging engagement with a corresponding plug-socket connector piece of a power cable. The power cable, in turn, is connected to a permanent power supply, such as a household power supply, or other source of permanent power, e.g., a ground or air vehicular power supply. The input power is provided to the input power port when the power cable is connected thereto and also to the permanent power supply is of input power characteristics.

In another aspect of the present invention, the input power provided at the input port of the connector is split into a first power component and a second power component. The power splitting is provided by use of wired leads forming separate conductive paths suitable for charge flow that defines the power components of the electrical power on the conductive paths. Power splitting alternatively is performed in alternate manners.

In another aspect of the present invention, the connector apparatus includes a set of two or more output ports that provide plug-socket, or other, connectors permitting connection of the output ports to consumer electronic devices. The output power ports are connected to the output power paths upon which the output power is conducted, once split by the power splitter. When the consumer electronic devices are connected to corresponding to output power ports, operative power is provided to the consumer electronic devices to permit their operation or to recharge the battery power supplies of the respective consumer electronic devices. Because two or more consumer electronic devices are able to be provided with operative power by way of the connector apparatus, a user of the electronic devices is able to power the devices with a permanent power supply without requiring that the devices each separately be connected to the permanent power supply by way of separate power cables. Increased convenience is provided, particularly when the user of the consumer electronic devices is traveling or would otherwise be required to carry separate power cables for the separate consumer electronic devices.

In one exemplary implementation, a first of the consumer electronic devices forms a laptop or notebook computer that includes a rechargeable, portable power supply, capable of powering the laptop computer for a limited time period. And, a power cable that includes a power converter is releasably connectable to the laptop computer. The electronic circuitry of the laptop computer, in conventional manner, utilizes direct-current power of relatively low voltage and current levels. When powered by way of the power cable, the power converter converts the power sourced at the permanent power supply into power of characteristics usable by the notebook computer. A second consumer electronic device is, e.g., a mobile phone, another laptop computer, or any of many other consumer electronic devices that includes the electronic circuitry operable to utilize direct-current power.

The connector apparatus is positioned in-line between the power cable and the notebook computer. That is to say, the power cable is connected, at one end thereof, to the source of permanent power and at another end thereof, to the connector apparatus. The input port of the connector apparatus is configured to correspond to the end side of the power cable to permit the interconnection therebetween, such as by a plugged connection. An output port of the connector apparatus is directly connected to the notebook computer. And, the output port of the connector apparatus is of a configuration permitting its plugged, or other, connection to the laptop computer. The connector apparatus is individualized according to the laptop computer with which the connector apparatus is to be operable. That is to say, the configurations of the input and output ports are made to permit its interconnection with the power cable and with the notebook computer in electrical connection therewith. The second output port of the connector apparatus is configured to permit its connection directly, or indirectly, with the second consumer electronic device.

In one implementation, the elements of the connector apparatus are housed at a connector housing that includes an elongated barrel member having opposing end sides. The input port is configured at a first of the opposing end sides, and one of the output ports is configured at an opposing end side. An outwardly-projecting knob member extends outwardly, at substantially a perpendicular angle, midway along the length of the barrel member. The second output port is configured at the knob member. The outwardly-projecting knob member together with the barrel member define a T-joint configuration. And, a handhold is formed on the barrel member facilitating user gripping of the connector.

When the set of consumer electronic devices are to be powered, or their batteries recharged, by a permanent power supply, only a single connection to the permanent power supply is required. Improved convenience of use of the consumer electronic devices by the user is thereby facilitated.

In these and other aspects, therefore, apparatus, and an associated method, is provided for converting input power into output power. The output power is of output characteristics that permit powering of a first electronic device and of a second electronic device. The apparatus comprises an input receiver adapted to receive input power of first selected input power characteristics. A power splitter is coupled to the input power receiver. The power splitter splits the input power into a first power component and a second power component. The first power component is of characteristics defining first selected output characteristics, and the second power component is of characteristics that are defined by second selected output characteristics. A first output power provider is coupled to the power splitter. The first power provider receives the first power component in to which the power splitter splits the input power. The first output power provider permits connection to the first electronic device to power the first electronic device with the first power component of the first selected characteristics. A second output power provider is coupled to the power splitter. The second output power provider receives the second power component into which the power splitter splits the input power. The second output power provider permits connection to the second electronic device with the second power component of the second selected characteristics.

A more complete appreciation of the present invention and the scope thereof can be obtained from the accompanying drawings that are briefly summarized below, the following detailed description of the presently-preferred embodiments of the present invention, and the appended claims.

BRIEF DESCRIPTION OF THE DRAWINGS

FIG. 4 illustrates a method flow diagram listing the method steps of the method of operation of an embodiment of the present invention.

DETAILED DESCRIPTION

Figure 1:
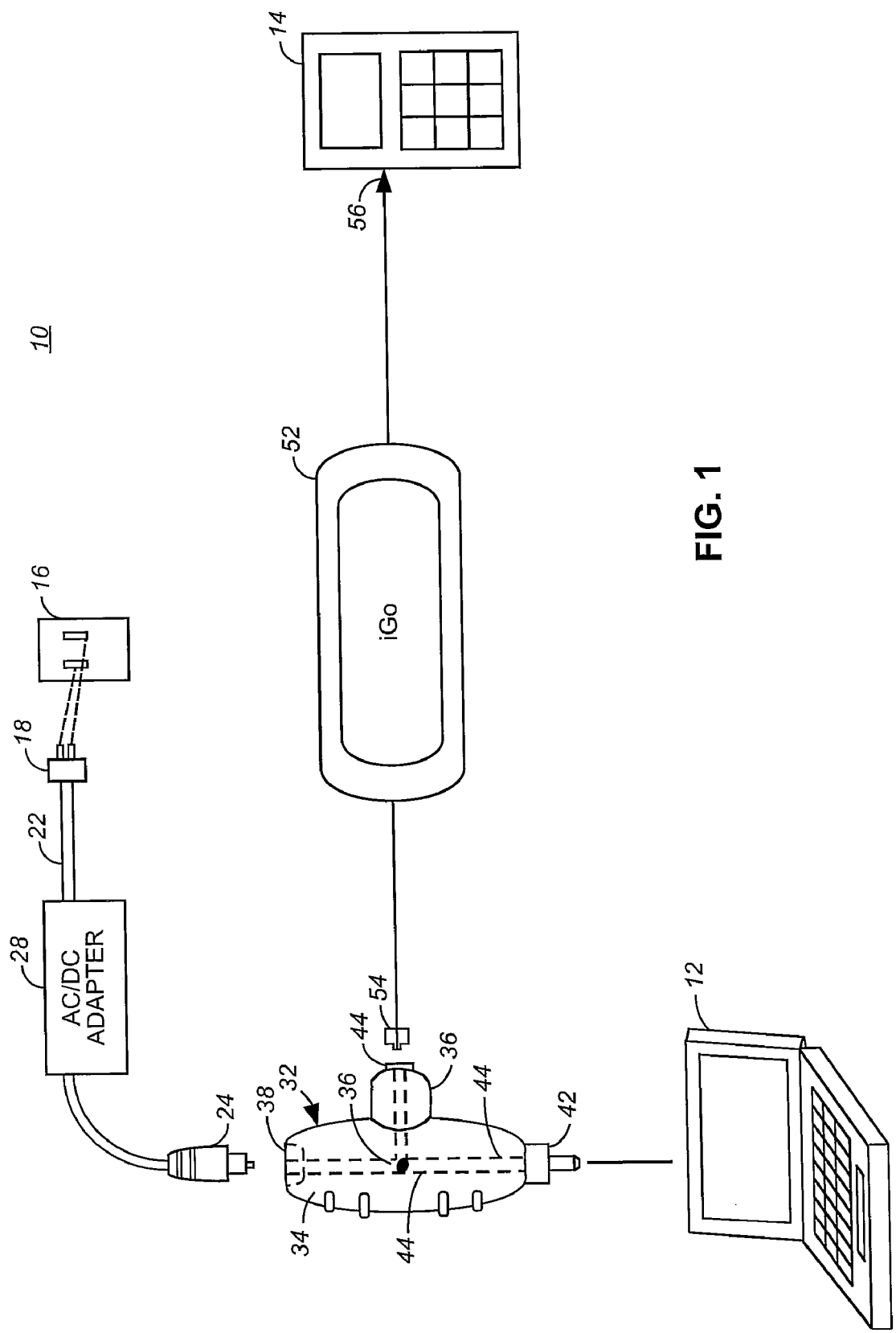
FIG. 1 illustrates a partial functional block, partial schematic diagram of a connector apparatus of an embodiment of the present invention positioned to power a set of consumer electronic devices.

Referring first to FIG. 1, an arrangement, shown generally at 10, provides for the application of power to a set of consumer electronic devices. The consumer electronic devices here comprise a laptop or notebook computer 12 and another portable electrical device 14, such as a mobile phone, personal digital assistant (PDA), other processing device, camera, etc.

In the exemplary implementation, the devices 12 and 14 each include rechargeable battery power supplies. And, the operative power applied to the devices is used to recharge, if necessary, the battery powers supplies thereof, to provide operative power to operate the devices, or both to recharge the battery power supplies and to provide operative power to the devices. And, in manners conventional of many electronic devices, the circuitry of the devices 12 and 14 are direct-current circuits, viz., the circuits operate upon application of direct-current power thereto. The operative power provided to the devices is direct-current power and is of voltage and current characteristics appropriate for the application of the power to the respective devices.

The electrical power provided to the devices 12 and 14 is sourced at a permanent power supply, here represented by a wall outlet 16 at which access to a household electrical supply is available in conventional manner, i.e., by plugged connection therewith. Here, a plug connector 18 of a power cable 22 is positionable in plugged connection with the wall outlet.

The power cable 22 is matched with the laptop computer 12. That is, the power cable includes a second plug connector 24 that is of a configuration to permit its direct connection to a corresponding plug-connector of the laptop computer. Laptop computers of different constructions of manufacture are of different plug-connector configurations. The plug connector 24 and corresponding plug connector of the lap top computer are matched with one another to permit their connection theretogether. The power cable 22 also includes a power converter, i.e., an AC/DC adapter 28, that converts the power sourced at the wall outlet 16 into power suitable for powering the lap top computer. In an alternate implementation in which the source of permanent power sources direct-current power, the power converter merely operates to step-up or step-down the voltage levels, as necessary, to form power of power levels appropriate to power the lap top computer 12. In whichever implementation, the power available at the plug connector 24 is of a level appropriate to power or recharge the battery power supply of the lap top computer 12.

Pursuant to an embodiment of the present invention, a connector 32 is provided, positionable in-line between the power cable 22 and the lap top computer 12, or other consumer electronic device. The connector is formed of a housing, here configured to include a barrel-shaped main housing body portion 34 and a knobular extension piece 36. The housing portion and pieces 34 and 36 are, in the exemplary implementation, integrally formed of a thermoplastic material.

The main housing portion 34 defines a first end side at which a plug connector 38 is positioned and a second end side at which a plug connector 42 is positioned. And, the extension 36 defines an end side at which a plug connector 44 is positioned. The plug connector is, as needed, a plug element or a socket element, permitting plug connection with a correspondingly mated plug connector. In the exemplary illustration shown in FIG. 1, the plug connector 38 forms a socket that receives the plug element 24 of which the plug connector 24 is formed. And, the plug connector 42 forms a plug element of a configuration permitting its connection to a socket (not shown) formed at the lap top computer 12. In other implementations, the plug connectors are of different configurations but permitting of connection between the power cable 22 and the connector 32 and between the connector 32 and the device 12.

Conductive leads 44 extend through the body of the housing to electrically interconnect the connectors 38 and 42. A power splitter 46 provides conductive leads that extend to the plug connector 34. The power splitter is, most simply, merely an electrical connection between leads 44 and extension leads 48. Operative power is provided thereby to both of the plug connectors 42 and 44.

The electrical device 14 is connected, here by way of an iGo™ dual power device 52. The dual power device includes plug connectors 54 and 56 of configurations appropriate for their electrical connection to the connector 44 and to the electrical device 14, respectively. In other implementations, the connection between the device 14 and the plug connector 44 is made in other manners. The iGo™ device 52 is manufactured by Mobility Electronics, Inc. and operates, in part, as a voltage regulator that provides power of selected power characteristics at the plug connector 56.

When the power cable 22 is connected to the source of permanent power, and the plug connectors are connected together such that input power is provided at the connector 38 and output power is provided at the connectors 42 and 44, the consumer electronic devices 12 and 14 are provided with power of power characteristics appropriate for powering of the devices. Only a single connection is required to the permanent power supply. The connector 32 is of dimensions that permit its easy carriage by the user or, most simply, maintained in permanent connection with the plug connector 24 of the power cable 22.

Figure 2:
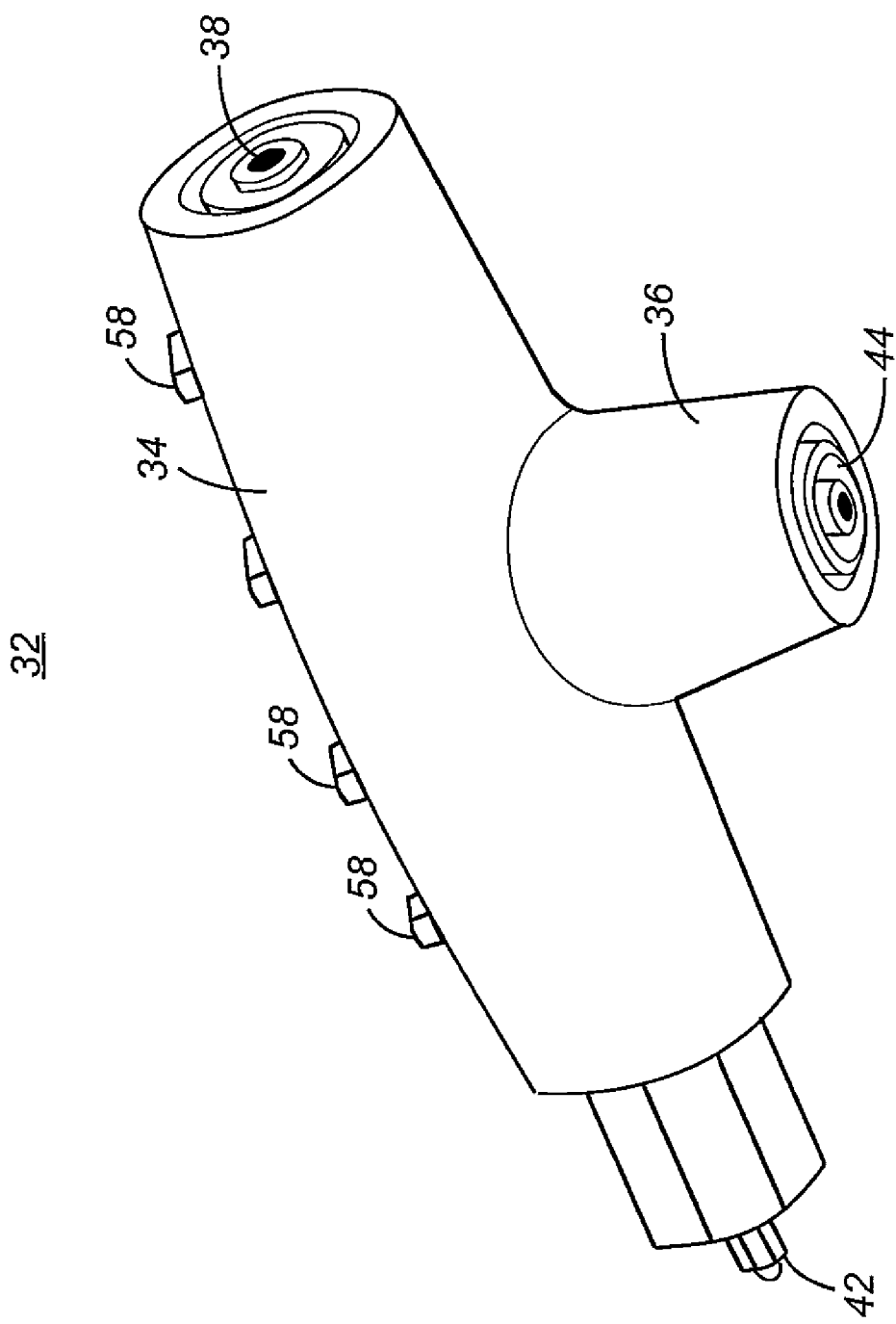
FIG. 2 illustrates a perspective view of the connector apparatus, in isolation, shown in FIG. 1.

FIG. 2 again illustrates the connector 32 shown in the arrangement 10 of FIG. 1. The connector again is shown to be formed of a housing having an elongated barrel-shaped main housing portion 34 and a knobbed extension 36. The plug connectors 38 and 42 formed at the end sides of the main housing portion as well as the plug connector 44 formed at the extension 36 are again shown. In the exemplary implementation, the main housing portion body includes, about outer perimeters thereof, handholds 58 to facilitate gripping by a user of the connector to connect the connector to the power cable and to the other elements to which the connector is connectable to provide electrical power.

Figure 3:
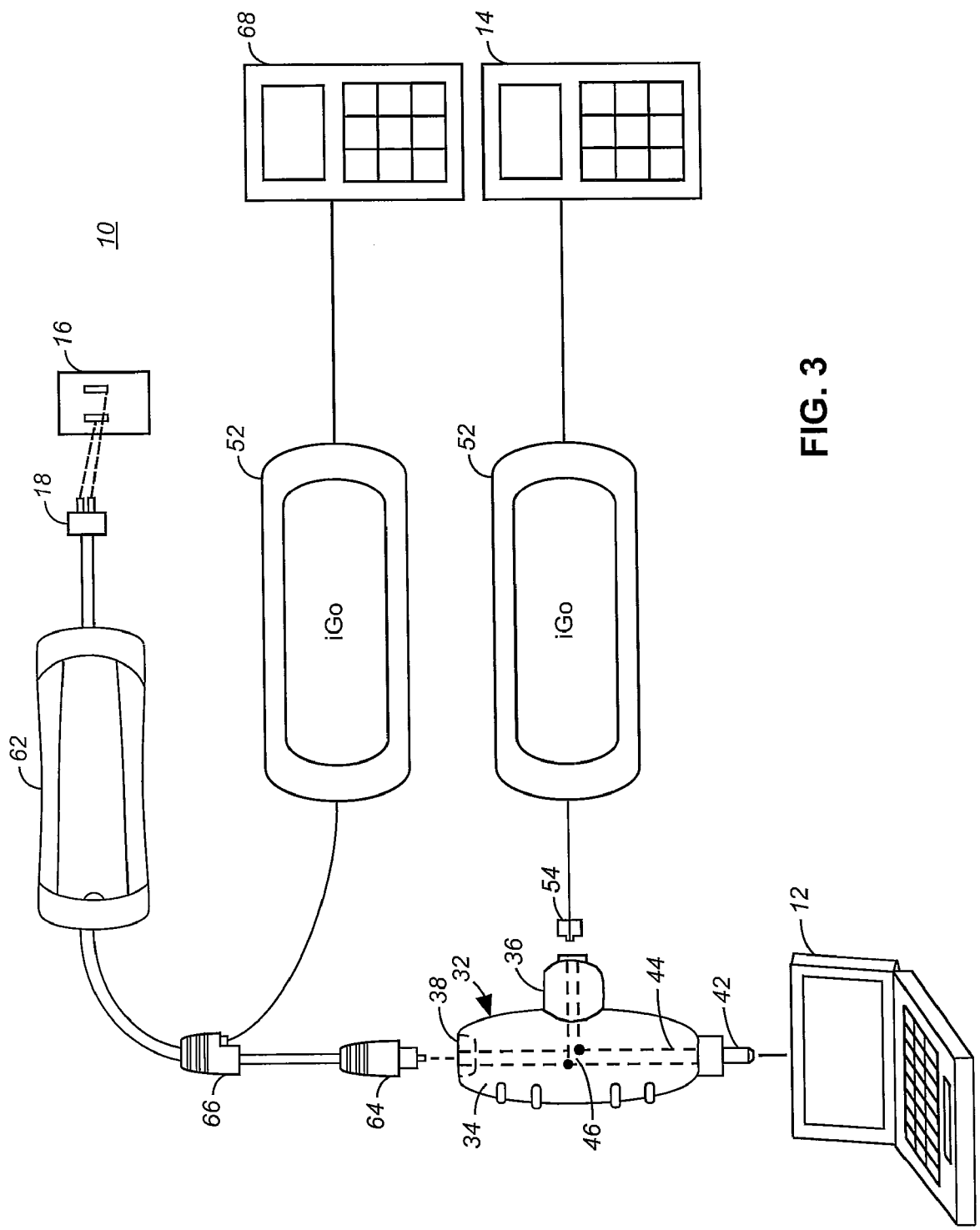
FIG. 3 illustrates a partial functional block, partial schematic diagram, similar to that shown in FIG. 1, of the connector apparatus of an embodiment of the present invention, here again positioned to provide operative power to a set of consumer electronic devices.

FIG. 3 illustrates an alternate arrangement, shown generally at 60, in which the connector 32 is again positionable to apply electrical power to a set of electronic devices, here again represented by a lap top computer 12 and another portable electrical device 14. Here again, the plug connectors 42 and 44 are provided with electrical power by way of the lines 44 and 46 by way of which to apply electrical power to the electrical devices. And, again, the portable electrical device 14 is connected to the plug connector 44 by way of the iGo dual power device ™.

In this arrangement, an iGo Universal Adapter™ 62 is utilized in substitution for the power cable 22 used in the arrangement 10 shown in FIG. 1. The adapter is manufactured by Mobility Electronics, Inc. The adapter forms an AC/DC adapter operable to provide electrical power of selected power characteristics responsive to application of input power provided thereto. The adapter includes a set of plug connectors 64 and 66. The connector 64 is analogous to the connector 24 shown in the arrangement of FIG. 1 and is of a configuration to permit its connection to the plug connector 38 of the apparatus 32. The connector 66 provides connection with an additional portable electrical device, here represented at 68. Again, the electrical device is connected to the connector by way of an iGo Dual Power Device™ 52. In other implementations, connections are made in other manners.

In this implementation, again, the user of the electronic devices is able to provide operative power thereto through connection to a single connection to a permanent power supply.

FIG. 4 illustrates a method, shown generally at 84, representative of the method of operation of an embodiment of the present invention. The method converts input power into output power in which the output power is of output characteristics that permit powering of a first electronic device and of a second electronic device.

First, and as indicated by the block 86, the input power is applied to an input power receiver supported at a supportive housing. The input power is of first input power characteristics.

The input power is split, indicated by the block 88, into a first power component and a second power component. The first power component is of characteristics defining first selected output power characteristics and the second power component is of characteristics defining second selected output characteristics.

Then, and as indicated by the block 92, the first power component is provided to a first power provider supported at the supportive housing. The first power provider is permitting of connection to the first electronic device to power the first electronic device with the first power component of the first selected characteristics. And, as indicated by the block 94, the second power component is provided to a second power provided supported at the supportive housing. The second power provider is permitting of connection to the second electronic device with the second power component of the second selected characteristics.

The previous descriptions are of preferred examples for implementing the invention, and the scope of the invention should not necessarily be limited by this description. The scope of the present invention is defined by the following claims.

What is claimed is:

1. A DC (direct current) connector for connecting a plurality of consumer electronics devices to a DC power supply cable, comprising:
  a housing comprising:
    an elongate main portion having a first end and a second end; and
    a knob-like projection extending outwardly from the main portion between the first end and the second end;
  a first socket for receiving a DC power supply cable plug connector, the first socket formed at the first end of the housing;
  a plug connector for plugging into a first electronics device, the plug connector mounted at the second end of the housing and extending therefrom, wherein the plug connector comprises a probe member and a collar member;
  a first pair of conductive leads extending within the housing from the first end to the second end and providing a DC path from the first socket to the plug connector;
  a second socket for receiving a second electronics device power cord connector plug, the second socket formed at the end of the knob-like projection; and
  a second pair of conductive leads extending within the housing from the first pair of conductive leads to the second socket and providing a DC path therebetween.

2. The connector of claim 1, wherein the main portion of the elongate housing is substantially round in cross-section.

3. The connector of claim 1, wherein the knob-like projection is formed substantially halfway between the first end and the second end.

4. The connector of claim 3, wherein the knob-like projection extends substantially perpendicular to the longitudinal axis of the main portion.

5. The connector of claim 1, wherein the knob-like projection is integrally formed with the main portion.

6. The connector of claim 5, wherein the housing is formed of a thermoplastic material.

7. The connector of claim 6, wherein the housing further comprises an integrally-formed handhold.

8. The connector of claim 7, wherein the handhold comprises a plurality of partially-circumferential ridges.

9. The connector of claim 8, wherein the partially-circumferential ridges extend outwardly from the main portion opposite the knob-like projection.

10. A method of supplying DC power to a plurality of consumer electronics devices from a single DC power supply cable, comprising:
  providing a DC connector, the connector comprising an elongate main housing portion having a first end and a second end, a knob-like projection extending outwardly from the main housing portion between the first end and the second end, a first socket formed at the first end, a probe-and-collar type plug connector mounted at the second end, a first pair of conductive leads extending within the housing from the first socket to the plug connector, a second socket formed at the end of the knob-like projection, and a second pair of conductive leads extending within the housing from the first pair of conductive leads to the second socket;
  receiving a plug connector of the DC power supply cable into the first socket;
  connecting the DC power supply cord to a power source;
  inserting the plug connector into a DC power socket on a first electronics device; and
  receiving a power plug connector coupled to the second electronics device in the second socket.

11. The method of claim 10, wherein the first electronics device is a computer.

12. The method of claim 11, wherein the second electronics device is a mobile telephone.

13. The method of claim 11, wherein the second electronics device is a PDA (personal digital assistant).

14. The method of claim 10, wherein the DC power supply cable comprises an AC/DC converter, and wherein the power source is an AC (alternating current) outlet.

15. The method of claim 10, wherein the power plug connector coupled to the second electronics device is coupled to the second electronics device through a dual power device.

* * * * *